(12) United States Patent
Okuda et al.

(10) Patent No.: US 9,947,150 B2
(45) Date of Patent: Apr. 17, 2018

(54) MAINTENANCE MONITOR DEVICE, AND PROGRAM AND RECORDING MEDIUM FOR THE SAME

(71) Applicant: MITSUBISHI HEAVY INDUSTRIES, LTD., Tokyo (JP)

(72) Inventors: Keisuke Okuda, Tokyo (JP); Masayuki Goto, Saitama (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 244 days.

(21) Appl. No.: 14/430,193

(22) PCT Filed: Nov. 5, 2013

(86) PCT No.: PCT/JP2013/079874
§ 371 (c)(1),
(2) Date: Mar. 20, 2015

(87) PCT Pub. No.: WO2014/073523
PCT Pub. Date: May 15, 2014

(65) Prior Publication Data
US 2015/0339868 A1 Nov. 26, 2015

(30) Foreign Application Priority Data
Nov. 8, 2012 (JP) ................................. 2012-246750

(51) Int. Cl.
*G07C 5/08* (2006.01)
*G06F 3/0484* (2013.01)
(Continued)

(52) U.S. Cl.
CPC ............. *G07C 5/0825* (2013.01); *G01D 7/04* (2013.01); *G06F 3/0482* (2013.01);
(Continued)

(58) Field of Classification Search
None
See application file for complete search history.

(56) References Cited

U.S. PATENT DOCUMENTS

| | | | |
|---|---|---|---|
| 7,953,530 B1 | 5/2011 | Pederson et al. | |
| 2007/0100520 A1* | 5/2007 | Shah ................... | G07C 5/008 |
| | | | 701/31.4 |

(Continued)

FOREIGN PATENT DOCUMENTS

| | | |
|---|---|---|
| CN | 1136168 A | 11/1996 |
| JP | H404306696 A | 10/1992 |

(Continued)

OTHER PUBLICATIONS

Espacenet machine translation of foreign application JP 2011019479 A.*

(Continued)

*Primary Examiner* — Abby Y Lin
*Assistant Examiner* — Paul A Castro
(74) *Attorney, Agent, or Firm* — Berkeley Law & Technology Group, LLP

(57) ABSTRACT

An object is to provide a maintenance monitor device which can display numerical data related to three or more display items on a graph simultaneously, with high visibility and operability. A maintenance monitor device (1) is capable of displaying a graph of numerical data of three or more of a plurality of display items related to an apparatus (14) subject to maintenance on a monitor screen (10), and includes: a list display unit (2) capable of displaying a list of the display items (22) on the monitor screen; a numerical data display unit (3) capable of displaying a graph of numerical data related to the three or more display items on the monitor screen in accordance with graph axes including a first axis which includes a time axis; a position information calculation unit (7) capable of calculating position information of a (Continued)

cursor (28) displayed on the monitor screen; a display item recognition unit (6) capable of recognizing the display items indicated by the cursor on the basis of the position information of the cursor calculated by the position information calculation unit; and a second axis display unit (5) configured to be capable of displaying only one scale (33) corresponding to the display item recognized by the display item recognition unit on a second axis included in the graph axes.

5 Claims, 5 Drawing Sheets

(51) Int. Cl.
*G06F 3/0481* (2013.01)
*G07C 5/12* (2006.01)
*G06F 3/0482* (2013.01)
*G01D 7/04* (2006.01)
*G06F 3/14* (2006.01)

(52) U.S. Cl.
CPC ........ *G06F 3/0484* (2013.01); *G06F 3/04812* (2013.01); *G06F 3/04842* (2013.01); *G07C 5/0808* (2013.01); *G07C 5/12* (2013.01); *G06F 3/14* (2013.01)

(56) References Cited

U.S. PATENT DOCUMENTS

| | | | |
|---|---|---|---|
| 2009/0144027 | A1 | 6/2009 | Mindeman et al. |
| 2013/0187923 | A1 | 7/2013 | Yoshimoto et al. |

FOREIGN PATENT DOCUMENTS

| | | | |
|---|---|---|---|
| JP | H06060279 A | | 3/1994 |
| JP | H06213685 A | | 8/1994 |
| JP | 2001042929 A | | 2/2001 |
| JP | 2003044132 A | | 2/2003 |
| JP | 2005063025 A | | 3/2005 |
| JP | 2005122535 A | | 5/2005 |
| JP | 2008209511 A | | 9/2008 |
| JP | 2009075029 A | | 4/2009 |
| JP | 2009104502 A | | 5/2009 |
| JP | 2009169225 A | | 7/2009 |
| JP | 2009199240 A | | 9/2009 |
| JP | 2010224760 A | | 10/2010 |
| JP | 2010536094 A | | 11/2010 |
| JP | 2011019479 A | * | 2/2011 |
| JP | 2011099773 A | | 5/2011 |
| JP | 2012168867 A | | 9/2012 |
| WO | 2014073523 A1 | | 5/2014 |

OTHER PUBLICATIONS

Supplementary European Search Report for App. No. EP13853408, Completed Sep. 22, 2015, dated Oct. 2, 2015, 6 pages.
First Office Action, Japanese App. No. 2012-246750, dated Aug. 18, 2016, 9 Pages.
Mitsubishi Heavy Industries, LTD., Notification Concerning Submission, Obtention or Transmittal of Priority Document, App. No. PCT/JP2013/079874, dated Dec. 17, 2013, 1 Page.
Mitsubishi Heavy Industries, Ltd., International Search Report, App. No. PCT/JP2013/079874, dated Feb. 10, 2014, 2 Pages.
Notification Concerning Transmittal of International Preliminary Report on Patentability, App. No. PCT/JP2013/079874, Filed Nov. 5, 2013, dated May 21, 2015, 13 Pages.
International Search Report, App. No. PCT/JP2013/079874, Filed Nov. 5, 2013, dated Feb. 10, 2014, 9 Pages.
First Office Action, Chinese Application No. 201380046766.7, dated Feb. 28, 2017, 16 Pages.

* cited by examiner

MAINTENANCE MONITOR DEVICE, AND PROGRAM AND RECORDING MEDIUM FOR THE SAME

TECHNICAL FIELD

The present disclosure relates to a maintenance monitor device capable of simultaneously displaying numerical data of three or more display items on a graph, and a program and a recording medium for the maintenance monitor device. It preferably relates to a maintenance monitor device, in particular, used for maintenance of a diesel engine mounted on an industrial vehicle, and a program and a recording medium for the maintenance monitor device.

BACKGROUND

For instance, when carrying out maintenance on various apparatuses such as a diesel engine, a maintenance monitor device is used to monitor the operation state of the apparatus in real time. The maintenance monitor device displays measurement values or the like that indicate the operation state of the apparatus on a monitor screen in real time.

FIG. 5 is a diagram of a monitor screen displayed by a conventional monitor device.

On the conventional monitor screen 100, a graph with the x-axis indicating time is displayed. On the graph, displayed are numerical data of a plurality of display items, such as the engine rotation speed (a), the acceleration opening degree (b), the cooling water temperature (c), the boost pressure (d), the intake temperature (e), the rail pressure (f), and the total fuel injection amount (g), associated with the graph axes.

Further, as illustrated in FIG. 5, scales, names, and units are displayed on the y-axis of the graph, corresponding to the plurality of display items (a) to (g) described above.

CITATION LIST

Patent Literature

Patent Document 1: Japanese Unexamined Patent Application Pub. No. 2008-209511

SUMMARY

Technical Problem

The above conventional monitor device, however, displays scales, names, units corresponding to the plurality of display items on the Y-axis next to one another. Thus, it is difficult to distinguish between the scales corresponding to the respective numerical data quickly, which is a disadvantage in terms of visibility.

Further, with more than one scale displayed on the graph, the time axis becomes short in turn, narrowing the display region of the graph, which is also a disadvantage in terms of visibility.

Furthermore, various exhaust-gas purification devices are recently provided for diesel engines in the context of, for instance, the tightened exhaust gas regulations. When carrying out maintenance on a diesel engine with an exhaust-gas purification device, it is necessary to monitor display items related to the exhaust-gas purification device, in addition to the display items related to the engine. Thus, the number of display items to be displayed has been considerably increased, which leads to a further disadvantage in terms of visibility in the above conventional monitor device.

Further, particularly during maintenance of a diesel engine, two or more display items are visually monitored at the same time, such as the engine rotation speed and the acceleration opening degree, and the engine rotation speed and the total fuel injection amount. Also, the display items are frequently switched. Thus, operability upon changing the graph display is also required for the monitor device, in addition to the above described visibility.

Patent Document 1 discloses a display-scale changing system that can change the scales of the graph when more than one display item is displayed on a graph. However, this display-scale changing system of Patent Document 1 requires frequent click and drag operations of a computer mouse, and therefore adept skills for operating the system.

At least one embodiment of the present invention was made in view of the above issues of the conventional technique, and an object is to provide a maintenance monitor device capable of displaying numerical data of three or more display items on a graph at the same time, with high visibility and operability.

Solution to Problem

In order to achieve the above object, at least one embodiment of a maintenance monitor device according to the present invention is a maintenance monitor device capable of displaying a graph of numerical data of three or more of a plurality of display items related, to an apparatus subject to maintenance on a monitor screen. The maintenance monitor device includes: a list display unit capable of displaying a list of the display items on the monitor screen; a numerical data display unit configured to be capable of displaying a graph of numerical data related to the three or more display items on the monitor screen in accordance with graph axes including a first axis which includes a time axis; a position information calculation unit configured to be capable of calculating position information of a cursor displayed on the monitor screen; a display item recognition unit configured to be capable of recognizing the display items indicated by the cursor on the basis of the position information of the cursor calculated by the position information calculation unit; and, a second axis display unit configured to be capable of displaying only one scale corresponding to the display item recognized by the display item recognition unit on a second axis included in the graph axes.

With the above maintenance monitor device, the visibility is enhanced because only one scale is displayed on the second axis of the graph axes. Further since the display item indicated by the cursor is recognized on the basis of the position information of the cursor, it is possible to display the single corresponding scale by a simple operation of only superposing the position of the cursor on one of the display items or the graph lines displayed on the monitor screen. Thus, the operability is also enhanced.

Further, in one embodiment of the present invention, the display item recognition unit is configured to recognize, from the list of the display items displayed on the monitor screen, one of the display items indicated by the cursor.

With the above configuration, it is possible to display the single scale corresponding to the display item by a simple operation of only superposing the position of the cursor on an optional one of the display items displayed on the monitor screen.

Further, according to one embodiment of the present invention, the display item recognition unit is configured to recognize, from among graph lines corresponding to the three or more display items of the graph displayed on the monitor screen, one of the display items which corresponds to one of the graph lines indicated by the cursor.

With the above configuration, it is possible to display the single scale corresponding to the display item by a simple operation of only superposing the position of the cursor on an optional one of the graph lines displayed on the monitor screen.

Further, one embodiment of the present invention further includes a display item selection unit configured to be capable of optionally selecting three or more display items from the list of the display items. The numerical data display unit is configured to display the graph of only the numerical data of the selected display items selected by the display item selection unit. The display item recognition unit is configured to recognize one of the selected display items selected by the display item selection unit.

With the above configuration, it is possible to select only the display items desired to be displayed on the graph, from the list of the display items displayed on the monitor screen, which makes it possible for the maintenance monitor device to achieve high visibility. Further, with the display item recognition unit configured to recognize only the selected display items selected by the display item selection unit, it is possible to reduce the frequency of displaying an unintended scale on the second axis due to operation error of the computer mouse. Thus, the operability is enhanced.

Further, in one embodiment of the present invention, the numerical data display unit is configured to indicate, on the graph, the numerical data of the display item recognized by the display item recognition unit by a graph line varied from the other numerical data.

With the above configuration, only the numerical data corresponding to the scale is indicated in the graph by a graph line varied from the other numerical data (e.g. different line type, thickness, or color) so as to stand out. In this way, it is possible to improve the visibility of the graph.

Further, in one embodiment of the present invention, the second axis display unit is configured to maintain a tick-mark interval of the scale to be constant regardless of the display item recognized by the display item recognition unit.

With the above configuration, the tick-mark interval of the scale is kept constant even when the scale displayed on the second axis is switched to another scale. Thus, it is possible to improve the visibility of the graph upon switching the scales.

Further, in one embodiment of the present invention, the apparatus subject to maintenance is a diesel engine mounted on an industrial vehicle.

The above maintenance monitor device is particularly suitable as a maintenance monitor device for a diesel engine mounted to an industrial vehicle such as a forklift. A diesel engine has many display items, and in a diesel engine, three or more of the display items are visually checked at the same time during maintenance, or the display items are frequently switched.

Further, at least one embodiment of the program of the present invention is a program for displaying a graph of numerical data of three or more display items related to an apparatus subject to maintenance simultaneously on a monitor screen. The program makes a computer execute: a list display process of displaying a list of the display items on the monitor screen; a numerical data display process of displaying a graph of numerical data related to the three or more display items on the monitor screen in accordance with graph axes including a first axis which includes a time axis; a position information calculation process of calculating position information of a cursor displayed on the monitor screen; a display item recognition process of recognizing the display items indicated by the cursor on the basis of the position information of the cursor calculated by the position information calculation unit; and a second axis display process of displaying only one scale corresponding to the display item recognized by the display item recognition unit on a second axis included in the graph axes.

With the above program, the visibility is enhanced because only one scale is displayed on the second axis of the graph axes. Further, since the display item indicated, by the cursor is recognized on the basis of the position information of the cursor, it is possible to display the single corresponding scale by a simple operation of only superposing the position of the cursor on one of the display items or the graph lines displayed on the monitor screen. Thus, the operability is also enhanced.

Further, at least one embodiment of the present invention includes a recording medium storing the above program, the recording medium being readable by a computer.

With the above configuration, it is possible to distribute the above program in a state where the program is stored in the recording medium.

Advantageous Effects

According to the at least one embodiment of the present invention, it is possible to provide a maintenance monitor device capable of displaying numerical data of three or more display items on a graph at the same time, with high visibility and operability.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

A maintenance monitor device 1 according to the present embodiment is configured as, for instance, a micro computer including a central processing unit (CPU), a random access memory (RAM), a read only memory (ROM), and an I/O interface. Also, the maintenance monitor device 1 is configured to display a graph of numerical data of display items related to an apparatus subject to maintenance, on a monitor screen 10. Further, the apparatus subject to maintenance in the present embodiment is, for instance, a diesel engine 14 mounted to an industrial vehicle such as a forklift.

Figure 1:
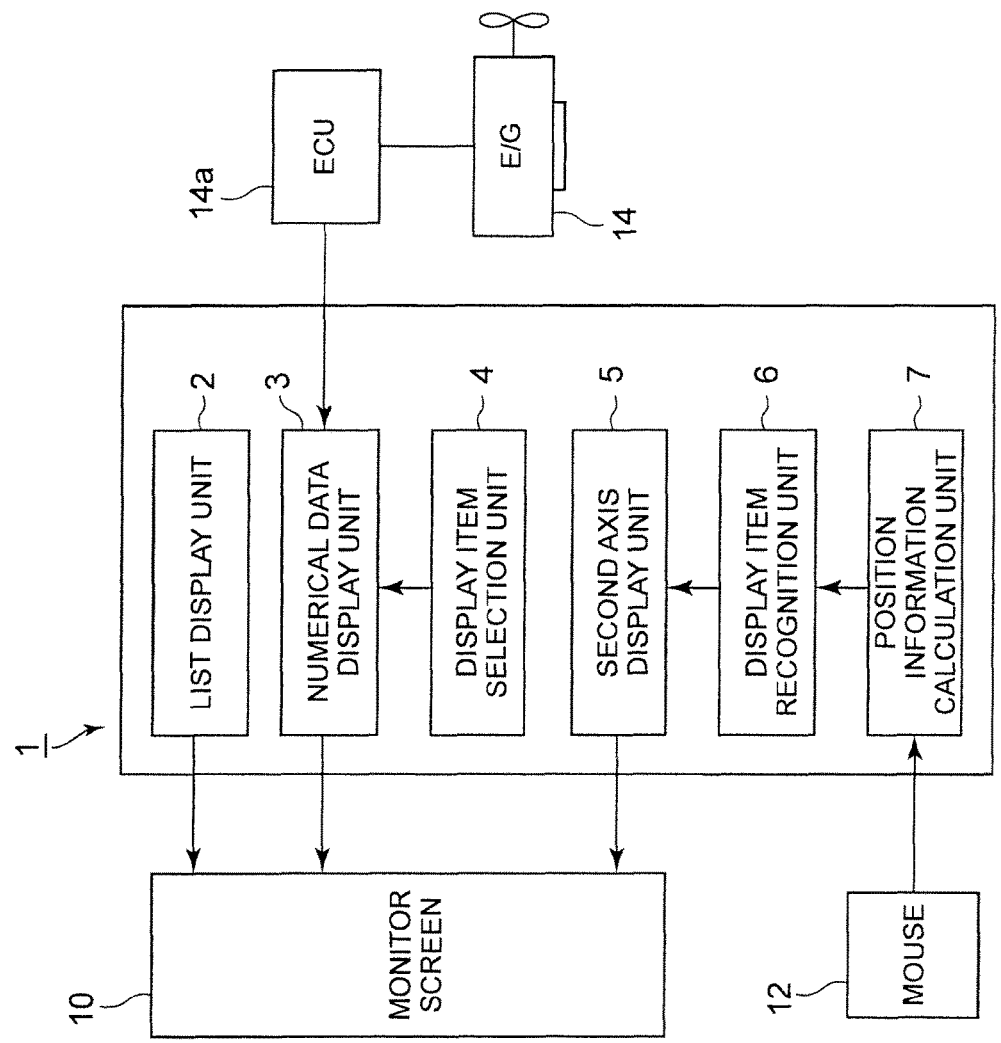
FIG. 1 is a block diagram illustrating components of a maintenance monitor device according to one embodiment of the present invention.

FIG. 1 is a block diagram illustrating components of a maintenance monitor device according to one embodiment of the present invention. As illustrated in FIG. 1, the maintenance monitor device 1 of the present embodiment includes a list display unit 2, a numerical data display unit 3, a display item selection unit 4, a second axis display unit 5, a display item recognition unit 6, and a position information calculation unit 7.

Figure 2:
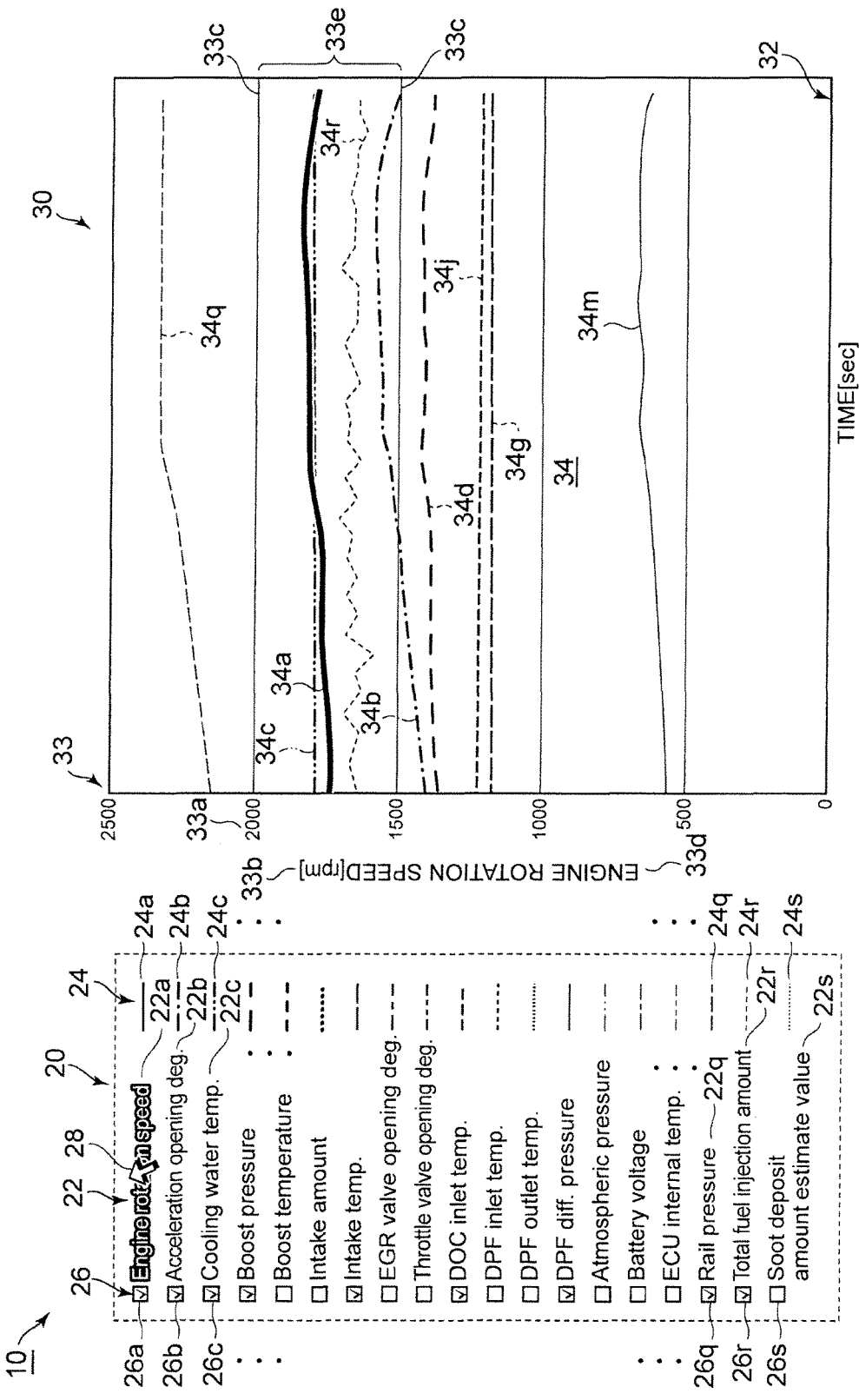
FIG. 2 is an illustration of a monitor screen of the maintenance monitor device according to the present embodiment.
Figure 3:
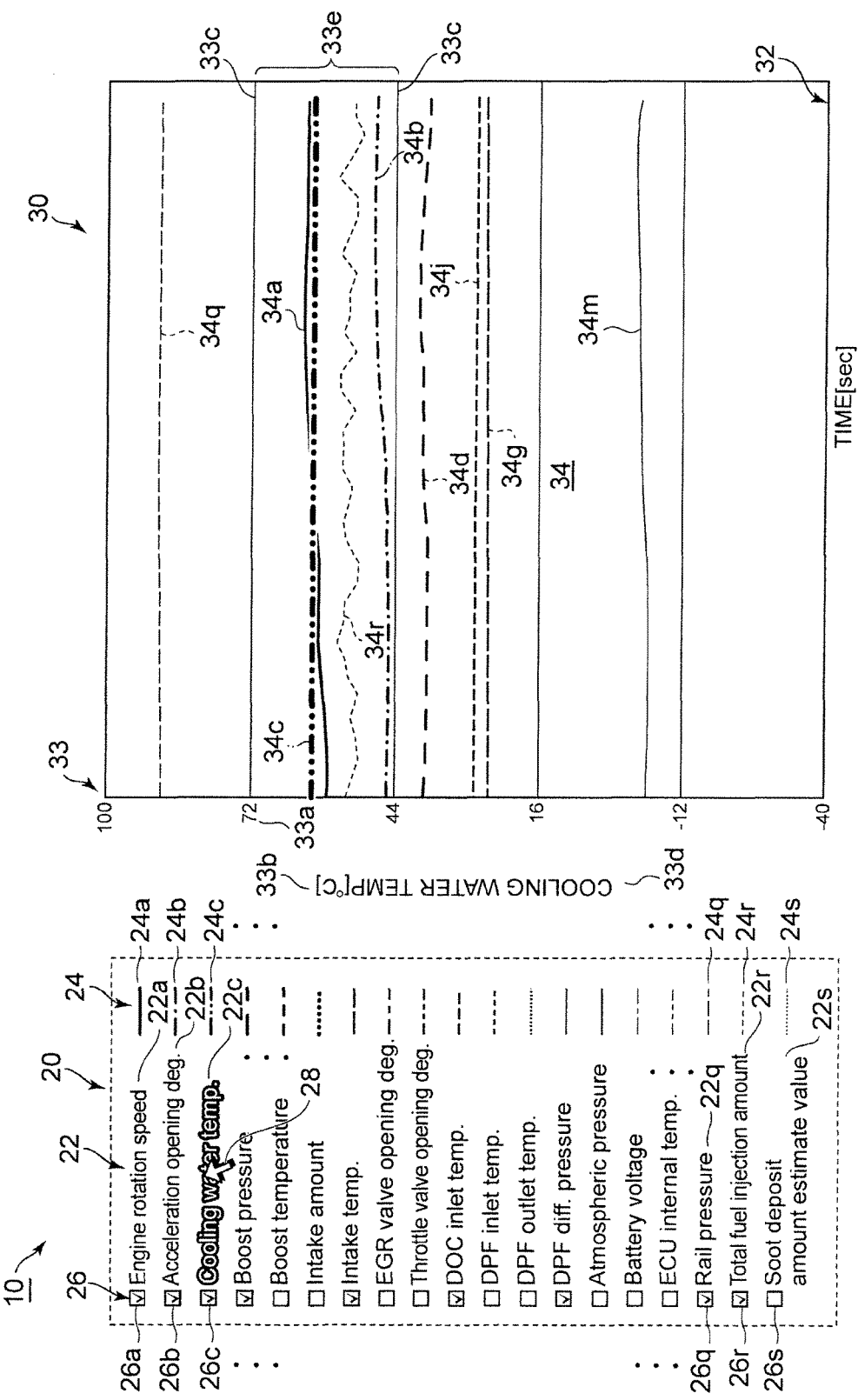
FIG. 3 is an illustration of a monitor screen of the maintenance monitor device according to the present embodiment, where the scale is switched from that in FIG. 2.

FIGS. 2 and 3 are each an illustration of a monitor screen of the maintenance monitor device according to the present embodiment.

As illustrated in FIGS. 2 and 3, a list display section 20 for displaying a list of display items 22 is formed on the left of the monitor screen 10. Further, a graph display section 30 for displaying a graph of numerical data of three or more of the display items 22 at the same time is formed on the right of the monitor screen 10.

The list display unit 2 is configured to be capable of displaying a list of all display items 22 (display items 22a to 22s) of the diesel engine 14, on the list display section 20 of the above monitor screen 10. Further, the list display section 20 displays legend lines 24a to 24s of the same line type and color as those of the graph lines 34a to 34s, in accordance with the display items 22a to 22s, respectively. In this way, it is possible to recognize the correspondence relationship between the graph lines 34a to 34s displayed on the graph display section 30 and the display items 22a to 22s.

The numerical data display unit 3 is configured to be capable of displaying the numerical data of the display items 22 transmitted from the engine control unit (ECU) 14a as the graph lines 31 on the graph display section 30 of the monitor screen 10. The graph lines 34 are displayed associated with graph axes including the first axis (for instance, x axis) being a time axis 32, and the second axis (for instance, y axis) being a scale 33. For example, the scale 33 here corresponds to the engine rotation speed 22a.

Further, the numerical data display unit 3 may be configured to display only the graph lines 34 corresponding to display items 22 selected by a display item selection unit 4 described below, which are the selected display items. For instance, in FIG. 2, a graph line 31a corresponding to the engine rotation speed 22a, a graph line 34b corresponding to the acceleration opening degree 22b, a graph line 34c corresponding to the cooling water temperature 22c, and the like are displayed as the graph lines 34 corresponding to the selected display items 22. With this configuration, it is possible to select only the display items 22 that need to be monitored, which enhances the visibility of the graph.

Further, the numerical data display unit 3 may be configured to display a graph of the numerical data of the display item 22 recognized by a display item recognition unit 6 described below by a graph line varied from those of the other numerical data. For instance, in FIG. 2, only the graph line 34a corresponding to the engine rotation speed 22a, which is recognized by the display item recognition unit 6, is indicated thicker than the other graph lines 34. Further, in FIG. 3, only the graph line 34c corresponding to the cooling water temperature 22c, which is recognized by the display item recognition unit 6, is indicated thicker than the other graph lines 34. With this configuration, it is possible to improve the visibility of the graph by displaying a graph where only the numerical data corresponding to the displayed scale 33 is indicated by a graph e varied from that of the other numerical data (e.g. different line type, thickness, or color) so that the corresponding numerical data stands out.

The display item selection unit 4 is configured to be capable of optionally selecting three or more items from the above list of the display items 22. Specifically, on the left of the list display section 20, check boxes 26a to 26s are displayed corresponding to the display items 22a to 22s, so that three or more display items 22 are optionally selected by placing check marks on the check boxes 26.

The second axis display unit 5 is configured to display only the scale 33 corresponding to one of the display items 22 that is selected by a user, on the second axis of the graph axes displayed on the above graph display section 30. For instance, FIG. 2, only the scale 33 corresponding to the engine rotation speed 22a is displayed. Further, in FIG. 3, only the scale 33 corresponding to the cooling water temperature 22c is displayed. The scale 33 here includes at least one scale marking 33a and unit 33b, and preferably further includes a scale grid 33c that is displayed so as to correspond to the scale marking 33a and an item name 33d of the display item 22 being displayed, so that the scale on the axis can be understood.

Furthermore, the second axis display unit 5 may be configured to maintain the display width 33e of the scale 33 to be constant regardless of the display item 22 recognized by the following display item recognition unit 6. For instance, the display width 33e of the scale 33 corresponding to the engine rotation speed 22a illustrated in FIG. 2 has an identical width to that of the display width 33e of the scale 33 corresponding to the cooling water temperature 22c illustrated in FIG. 3, With this configuration, the display width of the scale 33 is kept identical even when the scale 33 displayed on the second axis has been switched, which makes it possible to improve the visibility of the graph upon switching the scale 33.

The display item recognition unit 6 is configured to be capable of recognizing one of the display items 22 that is indicated by a cursor 28 displayed on the monitor screen 10, only on the basis of the position information of the cursor 28. Specifically, the cursor 28 moves on the monitor screen 10 as a result of operation of the computer mouse by the user, and when the position of the cursor 28 overlaps with one of the display items 22 displayed on the list display section 20, the display item recognition unit 6 immediately recognizes that the cursor 28 is pointing the one display item 22 even if there is no other specific operation such as a click. Then, the display item recognition unit 6 transmits the recognized display item 22 to the above second axis display unit 5.

Further, the display item recognition unit 6 may be configured to recognize only the display items 22 selected by the display item selection unit 4. Since the maintenance monitor device 1 of the present embodiment is configured to change the scale 33 that is to be displayed on the second axis only on the basis of the position information of the cursor 28, even a slight movement of the position of the cursor 28 may change what is displayed as the scale 33. Thus, with the display item recognition unit 6 configured to recognize only the display items 22 selected by the display item selection unit 4, it is possible to reduce the frequency of displaying an unintended scale due to an operation error of the computer mouse 12, thereby improving the operability.

FIG. 2 illustrates the cursor 28 overlapping with the engine rotation speed 22a. On the other hand, FIG. 3 illustrates the cursor 28 overlapping with the cooling water temperature 22c. At this time, like the engine rotation speed 22a and the cooling water temperature 22c illustrated in FIGS. 2 and 3, respectively, only one of the display items 22 that is recognized by the display item recognition unit 6 may be displayed in a different way from the other display items 22 so as to easily distinguish the recognized display item 22 from the other display items 22. For instance, bold fonts may be used to emphasize the recognized display item 22.

The position information calculation unit 7 is configured to be capable of calculating the position information of the cursor 28 displayed on the monitor screen 10. The calculated position information of the cursor 28 is then transmitted to the above display item recognition unit 6.

Figure 4:
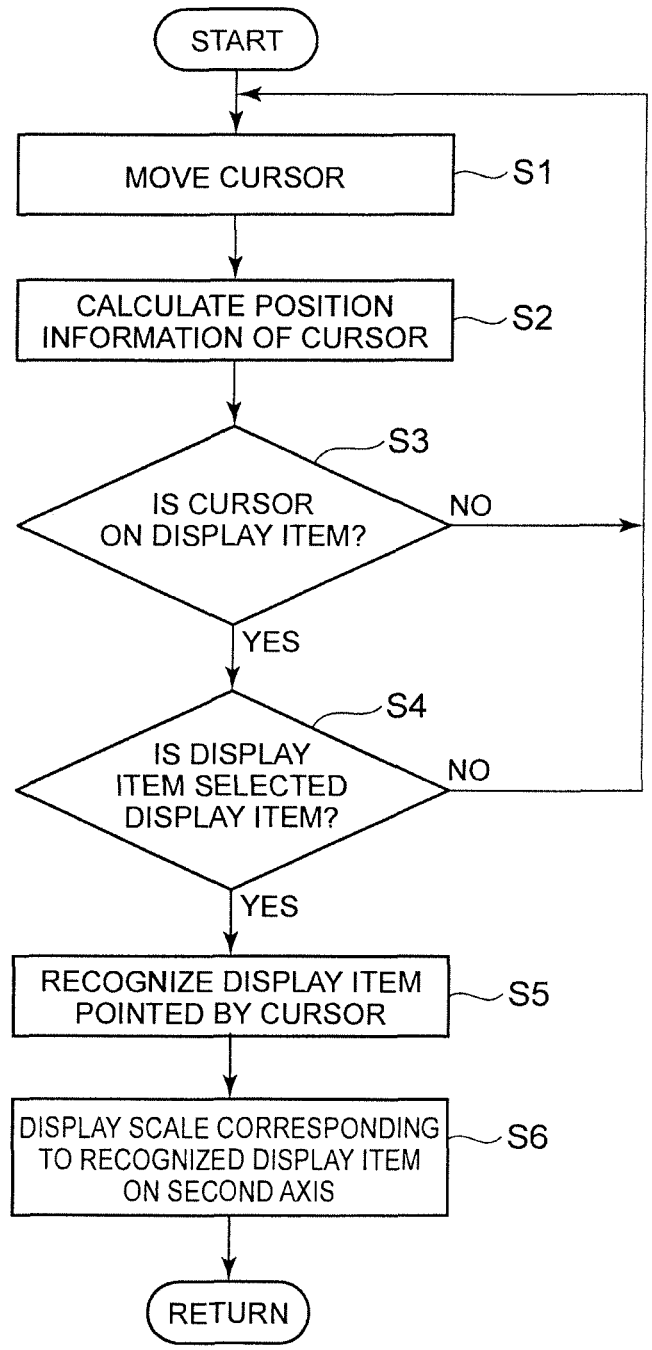
FIG. 4 is a flowchart of an operation flow for switching the scale to be displayed on the second axis, in a maintenance monitor device according to the present embodiment.
Figure 5:
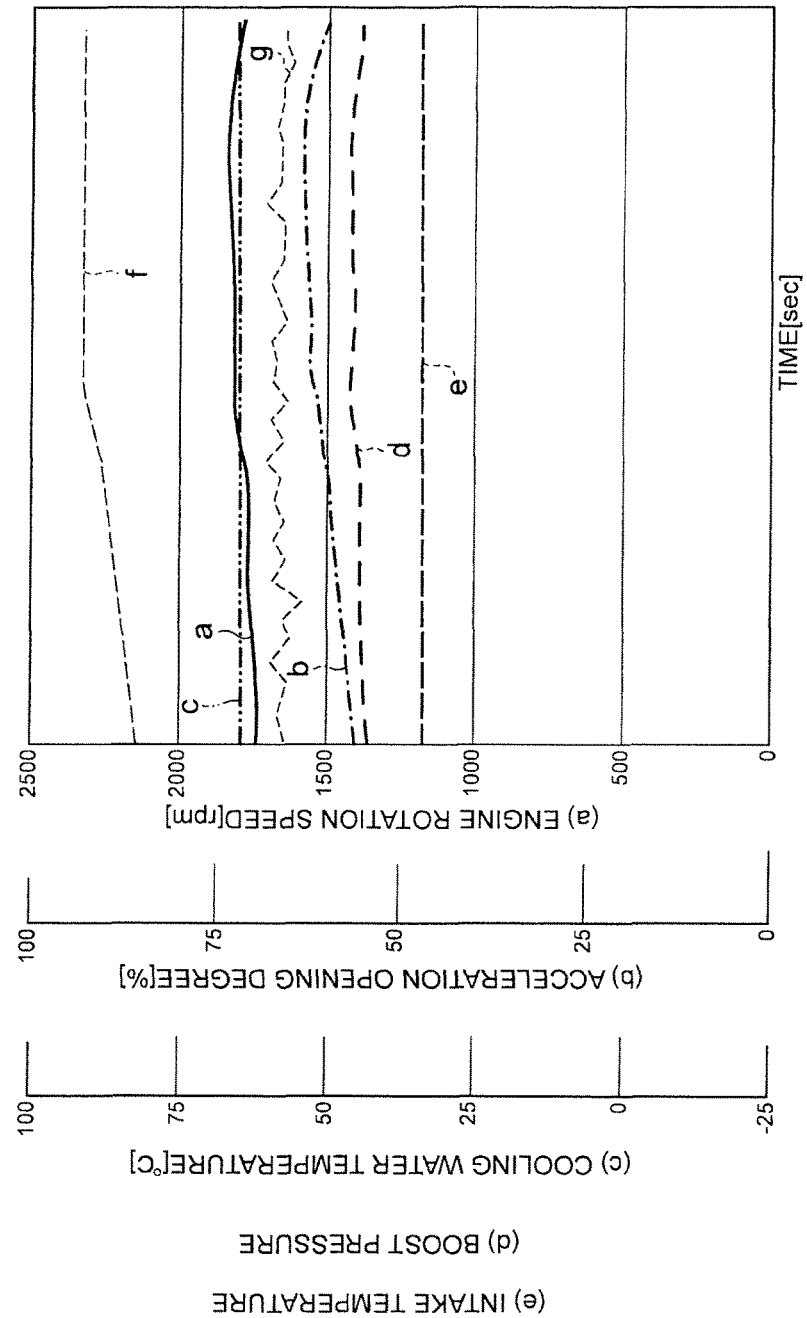
FIG. 5 is an illustration of a monitor screen displayed by a conventional monitor device.

FIG. 4 is a flowchart of an operation flow for switching a scale that is to be displayed on the second axis, in the maintenance monitor device according to the present embodiment. When the user operates the computer mouse 12 and the cursor 28 moves on the monitor screen 10 (S1), the above position information calculation unit 7 calculates the position information of the cursor 28 (S2). Then, on the basis of the calculated position information, the display item recognition unit 6 determines whether the position of the cursor 28 overlaps with one of the display items 22 displayed on the list display section 20 (S3), and whether the display item 22 with which the cursor 28 overlaps is one of the selected display items 22 selected by the above display item selection unit 4 (S4).

If it is determined to be YES in both of the above S3 and S4, the display item recognition unit 6 recognizes the single display item 22 pointed by the cursor 28 (S5), Then, the second axis display unit 5 displays a scale 33 that corresponds to the single display item 22 recognized by the display item recognition unit 6, on the second axis of the graph axes (S6).

The maintenance monitor device 1 of the present embodiment is configured to execute the above operation flow every time the cursor 28 moves. At this time, unless the position of the cursor 28 freshly overlaps with another display item 22 displayed on the list display section 20, the scale 33 corresponding to the single display item 22 having been most recently recognized is continuously displayed on the second axis of the graph axes even if the cursor 28 moves.

The above maintenance monitor device 1 has high visibility of the graph because only one scale 33 is displayed on the second axis of the graph axes. Further, the operability is also enhanced, as it is possible to display the scale 33 corresponding to an optional one of the display items 22 on the monitor screen 10 by a simple operation of only superposing the position of the cursor 28 on the optional display item 22 because the display item 22 indicated by the cursor 28 is recognized only on the basis of the position information of the cursor 28.

Embodiments of the present invention were described in detail above, but the present invention is not limited thereto, and various amendments and modifications may be implemented within a scope that does not depart from the present invention.

For example, in the above embodiments, the display item recognition unit 6 is configured to recognize one of the display items 22 that is indicated by the cursor 28, from the list of the display items 22 displayed on the monitor screen 10. However, the display item recognition unit 6 of the present invention is not limited this. Instead of the above configuration, or in addition to the above configuration, the display item recognition unit 6 may be configured to recognize one of the display items 22 that corresponds to one of the graph lines 34 indicated, by the cursor 28 from among the plurality of graph lines 34 displayed on the monitor screen 10, as the display item 22 indicated by the cursor 28.

Further, for instance, the maintenance monitor device 1 of the above embodiment is configured as a micro computer including a laptop computer.

However, at least one embodiment of the present invention may be a program configured to make a computer execute various processes executed by the above list display unit 2, the numerical data display unit 3, the display item selection unit 4, the second axis display unit 5, the display item recognition unit 6, and the position information calculation unit 7.

Further, at least one embodiment of the present invention may be a recording medium that stores the above described program, and that is readable by a computer. With this configuration, it is possible to distribute the above program in a state of being stored in the recording medium.

Further, in the above embodiment, while the apparatus subject to maintenance is illustrated, as the diesel engine 14 mounted to an industrial vehicle such as a forklift, the present invention is not limited to this. Still, the maintenance monitor device 1 of the present embodiment is particularly suitable to be used for the diesel engine 14 mounted to an industrial vehicle such as a forklift, which has a large number of display items 22, and in which three or more display items are visually checked at the same time during maintenance and the display items 22 are frequently switched.

INDUSTRIAL APPLICABILITY

At least one embodiment of the present invention, as a maintenance monitor device capable of displaying a graph of numerical data of three or more display items at the same time, is particularly suitable to be used during maintenance of a diesel engine mounted on an industrial vehicle.

REFERENCE SIGNS LIST

1 Maintenance monitor device
2 List display unit
3 Numerical data display unit
4 Display item selection unit
5 Second axis display unit
6 Display item recognition unit
7 Position information calculation unit
10 Monitor screen
12 Computer mouse
14 Diesel engine
20 List display section
22 Display item
24 Legend line
26 Check box
28 Cursor
30 Graph display section
32 Time axis
33 Scale
33a Scale marking
33b Unit
33c Scale grid
33d Item name
33e Display width
34 Graph line

The invention claimed is:

1. A maintenance monitor device to display a graph of numerical data of three or more of a plurality of display items, the display items to be related to a diesel engine mounted on an industrial vehicle, simultaneously on a monitor screen, the three or more of the plurality of display items to be selected optionally from display items of the diesel engine, the maintenance monitor device comprising a central processing unit and a memory storing instructions:

wherein the central processing unit is configured to execute the instructions stored on the memory to:

display, responsive to accessing the stored instructions, a list of the display items on the monitor screen;

display, responsive to accessing the stored instructions, three or more display items from the list of the display items selected optionally by a cursor;

display, responsive to accessing the stored instructions, a graph of numerical data related to the three or more display items on the monitor screen in accordance with graph axes, the graph axes to include a first axis which includes a time axis and a second axis which includes a scale to be different based, at least in part, on the display item; and a second axis display to display only one scale to correspond to one of the display items indicated by the cursor on the second axis included in the graph axes, wherein the central processing unit is configured to execute the stored instructions to, when the cursor overlaps with one of the display items displayed on the list of the display items, trigger the second axis to display the scale corresponding to the one of the display items overlapping with the cursor on the second axis when the one of the display items overlapping with the cursor is one of the display items selected, and wherein the central processing unit is configured to execute the stored instructions to, when the cursor overlaps with one of the display items displayed on the list of the display items, maintain the scale displayed on the second axis when the one of the display items overlapping with the cursor is not one of the display items selected, or wherein the central processing unit is configured execute the stored instructions to, when the cursor overlaps with one graph line of a plurality of graph lines which are displayed on the graph and which correspond to the three or more display items, trigger the second axis to display the scale corresponding to the display item which corresponds to the one graph line overlapping with the cursor on the second axis when the display item which corresponds to the one graph line overlapping with the cursor is one of the display items selected, and wherein the central processing unit is configured execute the stored instructions to, when the cursor overlaps with one graph line which is displayed on the graph and which corresponds to three or more display items, maintain the scale displayed on the second axis when the display item which corresponds to the one graph line overlapping with the cursor is not one of the display items selected.

2. The maintenance monitor device according to claim 1, wherein the central processing unit is configured to display the graph of only the numerical data of the selected display items.

3. The maintenance monitor device according to claim 1, wherein the central processing unit is configured to indicate, on the graph, the numerical data of the one of the display items to be indicated by the cursor by a graph line varied from the other numerical data.

4. The maintenance monitor device according to claim 1, wherein the central processing unit is configured to maintain on the second axis display, a constant width for a tick-mark interval of the scale regardless of the one of the display items.

5. A non-transitory computer-readable media, the non-transitory computer-readable media storing computer-readable instructions to display a graph of numerical data of three or more display items, the three or more display items related to a diesel engine mounted on an industrial vehicle, simultaneously on a monitor screen, the three or more of a plurality of display items selected optionally from display items of the diesel engine;

wherein the computer-readable instructions are configured to initiate a processor to execute:

a list display process to display a list of the display items on the monitor screen;

a display item selection process to optionally select three or more display items from the list of the display items by an operation of a cursor, a numerical data display process to display a graph of numerical data related to the three or more display items of the monitor screen in accordance with graph axes including a first axis, which includes a time axis, and a second axis, which includes a scale, which is different based, at least in part, on the display item; and a second axis display process to display only one scale corresponding to one of the three or more display items indicated by the cursor on the second axis included in the graph axes, wherein the computer-readable instructions are further configured to initiate the processor to, when the cursor overlaps with one of the display items displayed on the list of the display items, trigger the second axis to display the scale corresponding to the one of the display items overlapping with the cursor on the second axis when the one of the display items overlapping with the cursor is one of the display items selected by the display item selection process, and wherein the computer-readable instructions are further configured to initiate the processor to when the cursor overlaps with one of the display items displayed on the list of the display items, maintain the scale displayed on the second axis the one of the display items overlapping with the cursor is not one of the display items selected by the display item selection process, or wherein the computer-readable instructions are configured to initiate the processor to, when the cursor overlaps with one graph line of a plurality of graph lines which are displayed on the graph and which correspond to the three or more display items, trigger the second axis to display the scale corresponding to the display item which correspond with the one graph line overlapping with the cursor on the second axis when the display item which corresponds to the one graph line overlapping with the cursor is one of the display items selected by the display item selection process, and wherein the computer-readable instructions are configured to initiate the processor to, when the cursor overlaps with one graph line which are displayed on the graph and which correspond to three or more display items, maintain the scale displayed on the second axis when the display item which corresponds to the one graph line overlapping with the cursor is not one of the display items selected by the display item selection process.

* * * * *